Oct. 3, 1950     G. V. RANDEL     2,524,474
VALVE
Filed March 31, 1947     3 Sheets-Sheet 1
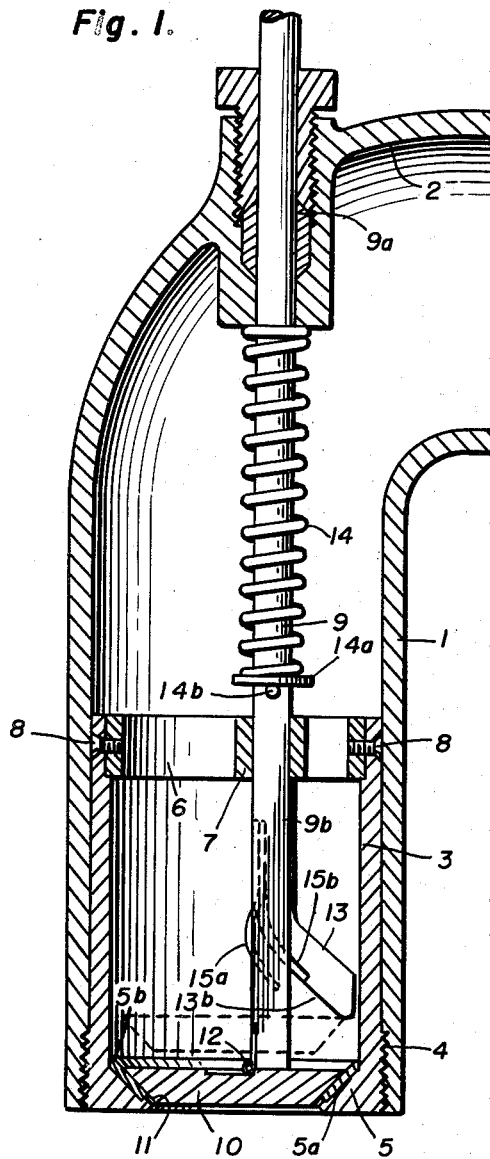
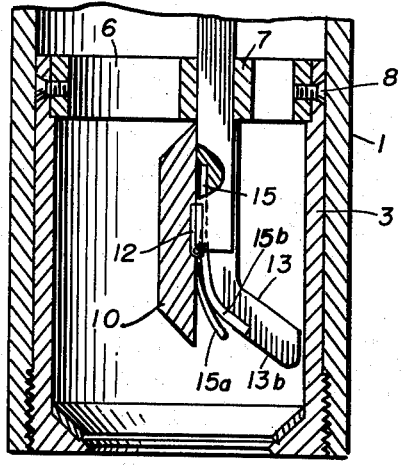
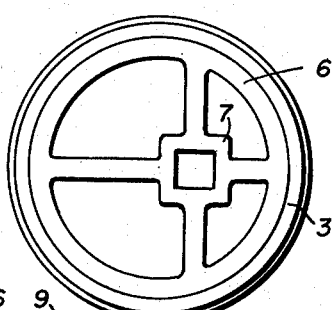
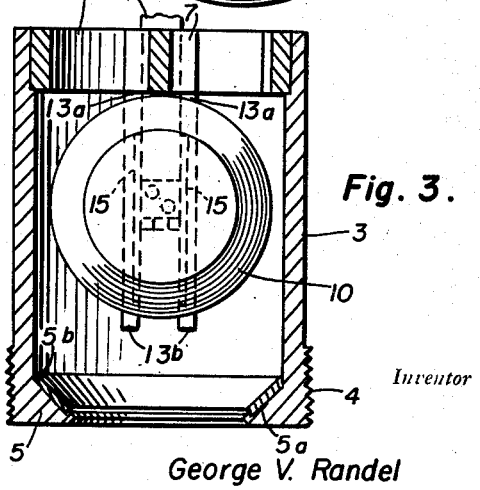
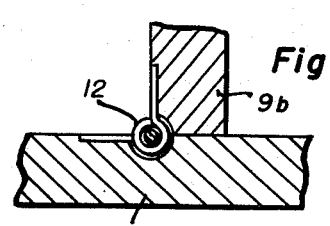
Inventor
George V. Randel
By *Clarence A. O'Brien
and Harvey B. Jacobson*
Attorneys Oct. 3, 1950  G. V. RANDEL  2,524,474
VALVE Filed March 31, 1947  3 Sheets-Sheet 2

Inventor
George V. Randel

By Clarence A. O'Brien
and Harvey B. Jacobson
Attorneys

Oct. 3, 1950 G. V. RANDEL 2,524,474
VALVE
Filed March 31, 1947 3 Sheets-Sheet 3

*Inventor*
George V. Randel

Patented Oct. 3, 1950

2,524,474

UNITED STATES PATENT OFFICE 2,524,474

VALVE

George V. Randel, Detroit, Mich.

Application March 31, 1947, Serial No. 738,376

6 Claims. (Cl. 251—17)

My invention relates to improvements in valves for use especially, although not necessarily, in the depending nozzles or hoses of liquid dispensing tanks for heavy liquids such as oil, to close such nozzles at the extreme outlet thereof.

The primary object of my invention is to provide for such nozzles, valve equipment so constructed and arranged that when the valve is closed liquid cannot drip from the nozzle or valve nor dirt or other foreign matter enter the nozzle.

Another object is to provide for such nozzles valve equipment in which a valve member is arranged to be held tightly closed and leakproof by a low tension expansion spring and the pressure of the liquid in the nozzle and tank.

Another object is to provide valve equipment for the purpose above indicated which is simple in construction, will not readily get out of order, and is inexpensive to manufacture and install.

Other and subordinate objects, also comprehended by my invention, together with the precise nature of my improvements, and the advantages thereof, will be readily understood when the succeeding description and claims are read with reference to the drawings accompanying and forming part of this specification.

In said drawings:

Figure 1 is a fragmentary view in vertical section of a preferred embodiment of my improved valve installed in the nozzle of a liquid dispensing tank, the valve member being shown closed.

Figure 2 is a similar view showing the valve member open.

Figure 3 is a view in vertical section of the valve casing and the parts therein turned through an angle of ninety degrees relative to the showing in Figures 1 and 2 and illustrating the valve member open.

Figure 4 is a view in top plan of the valve casing and spider.

Figure 13 is a fragmentary view in transverse section of still another modified embodiment of my invention.

Figure 5:
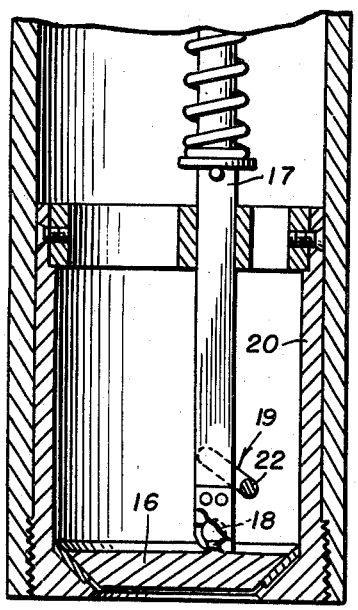
Figure 5 is a fragmentary view in vertical section of a modified embodiment of my invention with the valve member closed.

Referring to the drawings by numerals, and first to Figures 1 to 4 thereof, according to the preferred embodiment of my invention, a tubular, elbow-type discharge nozzle 1 with a bend 2 therein and such as is usually provided for draining an oil tank, not shown, is equipped with a tubular valve casing 3 suitably fitted tight therein with the lower end thereof threaded into the lower end of the nozzle, as indicated at 4. An internal, annular bevel valve seat 5 of downwardly tapered form is provided at the lower end of the valve casing 3 and which preferably although not necessarily is formed integrally therewith. The valve seat 5 may be grooved, as at 5a, to receive a suitable flat gasket 5b therein.

A spider 6 with an internally squared diametrically offset hub 7 is fastened preferably by screws, as at 8, into the upper end of the valve casing 3.

A valve stem 9 is vertically slidable in the hub 7 of the spider 6 and extended upwardly out of the nozzle 1 through a packing gland 9a in the bend 2 for operation manually, or otherwise, as desired to lift the same. The lower portion 9b of the valve stem 9 is of square cross-section to prevent the same from turning in the hub 7.

A circular, disc valve member 10 with a bevelled edge 11 for conformably fitting downwardly on the gasket 5b is hinged off center, on the back thereof, as at 12, to the lower end of the valve stem 9, at one side of said stem, to assume a vertical, open position with its hinge 12 at one side of the vertical axis of the valve seat 5. The hinge 12 is offset to one side of the center of the valve member 10 so that said member is overbalanced toward a normal, horizontal closing position, on the hinge 12, under the influence of gravity and to present on one side of said hinge 12 a greater top surface than on the other side for a purpose presently clear. Engagement of said valve member 10 with the bottom of the valve stem 9 establishes the closing position of said valve member on said stem.

A pair of laterally spaced, flat, valve swinging arms 13 depend from the hub 7 upon opposite sides of the valve stem 9. The valve swinging arms 13 are provided with vertical upper working edges 13a substantially co-planar with the side of the valve stem 9 at which the valve member 10 is hinged, and also with lower end working edges 13b inclining upwardly toward the side of the valve stem 9 on which the valve member 10 is hinged. The valve swinging arms 13 terminate at the lower ends thereof above the valve seat 5 to permit the valve member 10 to swing under said ends for a purpose presently seen.

An expansion type coil spring 14 surrounds the valve stem 9 between the packing gland 9a and the spider 6 and rests upon a washer 14a supported by a pin 14b in said stem and whereby the stem 9 and the valve member are urged downwardly in the nozzle 1.

A pair of leaf springs 15 are set into and suitably secured in the working edges 13a of the valve swinging arms 13 with curved lower free ends 15a bulging forwardly of the side of the valve stem 9 at which the valve member 10 is hinged and which are adapted to be retracted into recesses 15b in the working edges 13b.

Referring now to the operation of the described embodiment of my improved valve. When the valve is closed as shown in Figure 1, the valve stem 9 and valve member 10 are in a lowered position and held lowered by the spring 14, and the valve member 10 is swung into a horizontal position at a right angle to said stem, underneath the valve swinging arms 13, and is conformably fitted against the gasket 5b to be tightly seated by the liquid pressure in the nozzle 1 against the greater top surface on the one side of the hinge 12, and by the spring 14, conjointly. To open the valve, the valve stem 9 is lifted, by any suitable means, to lift the valve member 10 and unseat the same. During such lifting of the valve member 10, the smaller top surface on the other side of the hinge 12 engages the lowered inclined working edges 13b of the valve swinging arms 13 whereby said valve member is first cammed toward vertical open position and then cammed by the vertical edges 13a into vertical fully opened position as shown in Figures 2 and 3. During initial opening, before the valve member 10 engages the working edges 13a, said member compresses the free ends 15a of the springs 15 into the recesses 15b. To close the described valve, the valve stem 9 is released for lowering by the spring 14. During lowering of the valve stem 9, the valve member 10, as soon as the hinge 12 is lowered sufficiently relative to the lower free ends 15a of the springs 15, is swung toward closing horizontal position by reaction of said free ends 15a against the top surface of said member above said hinge. As said valve member 10 is lowered below the valve swinging arms 13, the same assumes horizontal closing position by being overbalanced because of the described offset hinging thereof and this horizontal closing position is assumed by said member at an intermediate point between the lower ends of the valve swinging arms 13 and the valve seat 5 as shown in dotted lines in Figure 1. Further lowering of the valve member 10 from this intermediate position seats the same to be maintained tightly seated by the spring 14 and the pressure of liquid in the nozzle on the top of the member at the side of the hinge 12 on which the greater surface of the top is disposed. As will be clear, the greater pressure of liquid in the nozzle 1 against the greater top surface on one side of the hinge 12 acts to swing the valve members 10 into horizontal position.

In the modified embodiment of the invention shown in Figures 5 to 8, the valve member 16 is provided with an offset hinge as in the preferred embodiment but having its axis in the vertical axis of the valve stem 17, as at 18. A valve swinging rod-like bail 19 is provided, in lieu of the valve swinging arms 13 of the preferred embodiment of the invention, and which extends transversely of the valve casing 20. The valve swinging bail 19 is provided with aligned end portions 21 suitably connected in horizontal position, to opposite sides of the valve casing 20, and a central loop portion 22 straddling the valve stem 17 and inclining upwardly toward the side of the valve stem 17 on which the valve member 16 swings into vertical open position.

Figure 6:
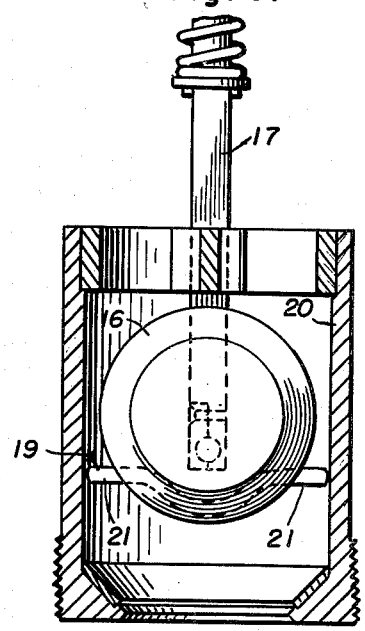
Figure 6 is a similar view with the parts turned at an angle of ninety degrees and showing the valve member open.
Figure 8:
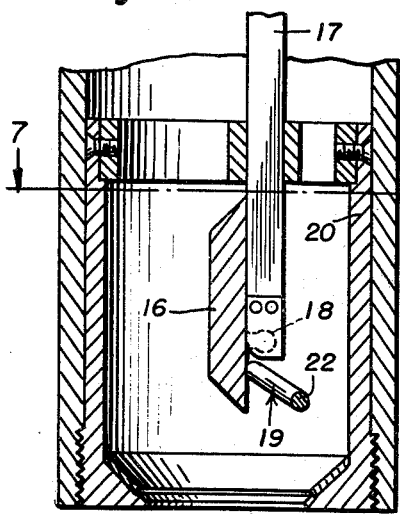
Figure 8 is a view in vertical section taken on the line 8—8 of Figure 7.
Figure 7:
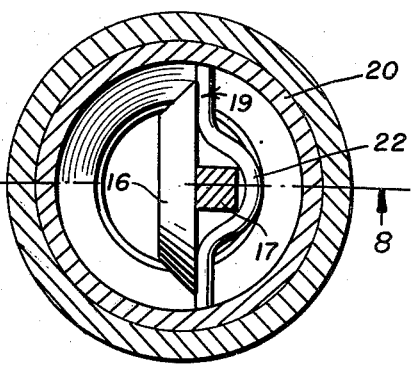
Figure 7 is a view in transverse section taken on the line 7—7 of Figure 8.
Figure 9:
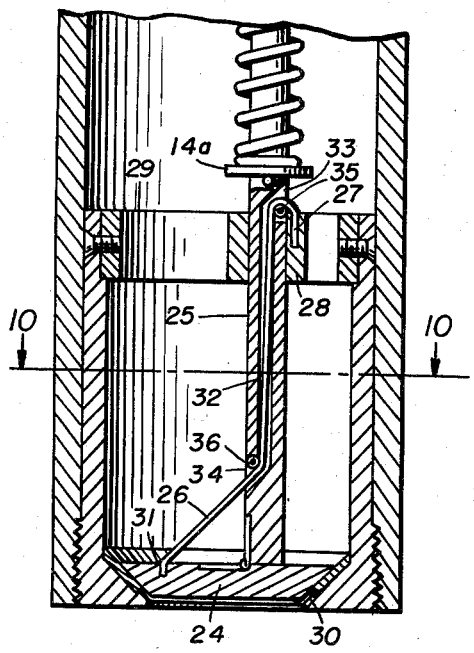
Figure 9 is a fragmentary view in vertical section illustrating another modified embodiment of my invention installed and with the valve member closed.
Figure 12:
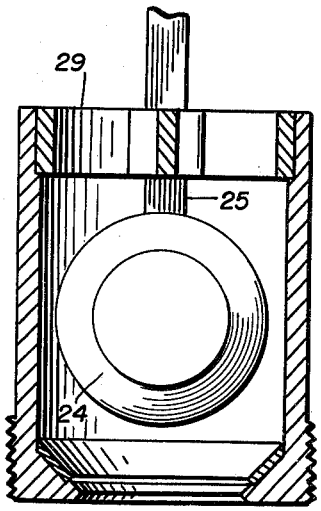
Figure 12 is a view in vertical section of the valve casing and parts therein of the modified embodiment shown in Figures 9, 10 and 11.
Figure 11:
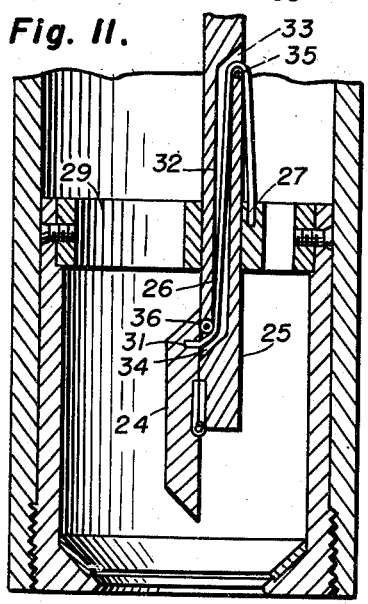
Figure 11 is a view similar to Figure 9 with the parts turned at an angle of ninety degrees and the valve member shown open.
Figure 10:
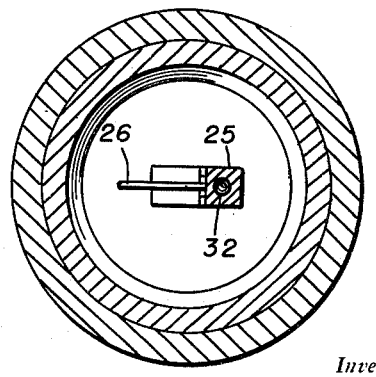
Figure 10 is a view in transverse section taken on the line 10—10 of Figure 9.

In the described modified embodiment of my invention, the valve member 16, when the valve stem 17 is raised sufficiently, is swung by the valve swinging bail 19 into vertical freely opening position as shown in Figures 6, 7 and 8. Otherwise, than as regards the hinge 18 and the valve swinging bail 19, the construction and arrangement in this modified embodiment is the same as in the preferred embodiment of the invention with the exception that the springs 15 of the preferred embodiment are eliminated.

In the modified embodiment of the invention shown in Figures 9 to 12, and in lieu of the valve swinging arms 13 and bail 22 of the other embodiments, the valve member 24 is arranged to be opened, under upward movement of the valve stem 25 by means of the following. A cable 26 is suitably fixed at one end 27 in the hub 28 of the spider 29 and trained above said spider into the valve stem 25 and then downwardly, slidably, through said stem with its other end 31 extended out of the lower end portion of said stem and suitably connected to the valve member 24 adjacent the edge of said member, and on the side of the stem 25 on which the greater top surface of said member is disposed, so that upward pull on the end 31 of the cable 26 will swing the valve member 24 from horizontal position shown in Figures 9 and 10 into vertical opening position shown in Figures 11 and 12. A longitudinal bore 32 with lateral upper and lower ends 33, 34 opening onto opposite sides of the valve stem 25, said bore extending for a suitable distance in the valve stem 25, provides for extending the cable 26 into said stem and downwardly therein and then out of the same. Rollers 35, 36 may be provided in the upper and lower ends 33, 34 of the bore 32 to prevent the cable 26 from chafing.

Referring now to the operation of the last described modified embodiment, when the valve stem 25 is lifted, to lift the valve member 24 off the valve seat 30, a loop is formed in the cable 26 by the roller 35 and the end 31 of said cable 26 is pulled upwardly to swing the valve member 24 to open vertical position in which the same is disposed vertically alongside one side of the valve stem 25. When the valve stem 25 is lowered, a slack is created in the cable 26 to permit the valve member 24 to be cammed by the seat 30 into horizontal closing position and this operation is augmented by gravity and liquid pressure in the same manner as described with reference to the other embodiments.

As shown in Figure 13, a spring hinge 37 may be provided for the valve member 38 facilitating swinging of the same toward horizontal closing position. Such a spring hinge may be substituted for the springs 15.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

What I claim is:

1. A valve for use in a depending nozzle of a liquid dispensing tank comprising a cylindrical valve casing adapted to be extended into said nozzle and having a lower end valve seat therein of annular tapered form, a valve stem extending into said casing and endwise movable to be raised and lowered relative to said seat, means in said casing for guiding the valve stem in a straight line during raising and lowering thereof, a bevelled disc valve member hinged to the lower end of said valve stem to be swung thereon when said stem is raised into vertical open position and overbalanced to swing under the influence of gravity and liquid pressure into horizontal closing position crosswise of said casing for engagement with said seat when said stem is lowered, means to swing said valve member open, and means to establish the horizontal closing position of the valve member.

2. A valve for use in a depending nozzle of a liquid dispensing tank comprising a cylindrical valve casing adapted to be extended into said nozzle and having a lower end valve seat therein of annular tapered form, a valve stem extending into said casing and endwise movable to be raised and lowered, means in said casing for guiding the valve stem in a straight line during raising and lowering thereof, a bevelled disc valve member hinged to the lower end of said valve stem to be swung thereon when said stem is raised into vertical open position and overbalanced to swing under the influence of gravity and liquid pressure into horizontal closing position crosswise of said casing for engagement with said seat when said stem is lowered, said valve member being hinged to said stem in offset relation to the axis of said valve to overbalance the same, and engaging said stem to establish the horizontal open position thereof, and means to swing said valve member open.

3. A valve for use in a depending nozzle of a liquid dispensing tank comprising a cylindrical valve casing adapted to be extended into said nozzle and having a lower end valve seat therein of annular tapered form, a valve stem extending into said casing and endwise movable to be raised and lowered, means in said casing for guiding the valve stem in a straight line during raising and lowering thereof, a bevelled disc valve member hinged to the lower end of said valve stem to be swung thereon when said stem is raised into vertical open position and overbalanced to swing under the influence of gravity and liquid pressure into a horizontal closing position crosswise of said casing for engagement with said seat when said stem is lowered, said valve member being hinged to said stem in offset relation to the axis of said valve to overbalance the same, means in said casing for gradually swinging the valve member into vertical position when the valve stem is raised, spring means for lowering said stem, and means for establishing the horizontal closing position of said valve member.

4. A valve for use in a depending nozzle of a liquid dispensing tank comprising a cylindrical valve casing adapted to be extended into said nozzle and having a lower end valve seat therein of annular tapered form, a valve stem extending into said casing and endwise movable to be raised and lowered, means in said casing for guiding the valve stem in a straight line during raising and lowering thereof, a bevelled disc valve member hinged to the lower end of said valve stem to be swung thereon when said stem is raised into vertical open position and overbalanced to swing under the influence of gravity and liquid pressure into horizontal closing position crosswise of said casing for engagement with said seat when said stem is lowered, means in said casing for swinging the valve member into vertical open position while said stem is being raised comprising arms fixed in said casing upon opposite sides of said stem, means for starting said valve member toward horizontal position as said stem is lowered, and means to establish the horizontal closing position of said valve member.

5. A valve for use in a depending nozzle of a liquid dispensing tank comprising a cylindrical valve casing adapted to be extended into said nozzle and having a lower end valve seat therein of annular tapered form, a valve stem extending into said casing and endwise movable to be raised and lowered, means in said casing for guiding the valve stem in a straight line during raising and lowering thereof, a bevelled disc valve member hinged to the lower end of said valve stem to be swung thereon when said stem is raised into vertical open position and overbalanced to swing under the influence of gravity and liquid pressure into horizontal closing position crosswise of said casing for engagement with said seat when said stem is lowered, said valve member being hinged to said stem in offset relation to the axis of said valve to overbalance the same, means in said casing for swinging the valve member into vertical open position while said stem is being raised comprising a camming bail extending crosswise of said casing and fixed therein in straddling relation to said stem, and means to establish the horizontal closing position of said valve member.

6. A valve for use in a depending nozzle of a liquid dispensing tank comprising a cylindrical valve casing adapted to be extended into said nozzle and having a lower end valve seat therein of annular tapered form, a valve stem extending into said casing and endwise movable to be raised and lowered, means in said casing for guiding the valve stem in a straight line during raising and lowering thereof, a bevelled disc valve member hinged to the lower end of said valve stem to be swung thereon when said stem is raised into vertical open position and overbalanced to swing under the influence of gravity and liquid pressure into a horizontal closing position crosswise of said casing for engagement with said seat when said stem is lowered, said valve member being hinged to said stem in offset relation to the axis of said valve to overbalance the same, means in said casing for swinging the valve member into vertical open position while said stem is being raised comprising a pull cable attached at one end to said valve member and slidably extended through said stem with its other end attached to said valve stem guiding means for upward pulling of said first named end by raising of said stem, and means to establish the horizontal closing position of said valve member.

GEORGE V. RANDEL.

REFERENCES CITED

The following references are of record in the file of this patent:

UNITED STATES PATENTS

| Number | Name | Date |
|---|---|---|
| 971,802 | Tanner | Oct. 4, 1910 |
| 1,014,775 | Rothchild | Jan. 16, 1912 |

FOREIGN PATENTS

| Number | Country | Date |
|---|---|---|
| 339,298 | Great Britain | 1930 |
| 372,921 | Great Britain | 1932 |